United States Patent [19]
Gulick et al.

[11] Patent Number: 6,028,701
[45] Date of Patent: Feb. 22, 2000

[54] STAIRSTEP INTERLOCK MOUNTING PACKAGE FOR MULTISCREEN PROJECTION DISPLAYS

[75] Inventors: Paul E. Gulick, Tualatin; Benjamin R. Clifton, Oregon City; John P. Fogarty, West Linn; David B. Kubeja, Portland, all of Oreg.

[73] Assignee: Clarity Visual Systems, Inc., Wilsonville, Oreg.

[21] Appl. No.: 08/920,399

[22] Filed: Aug. 29, 1997

[51] Int. Cl.[7] ............................. G03B 21/56; G03B 21/15
[52] U.S. Cl. ........................... 359/443; 359/449; 353/74; 353/94; 353/119
[58] Field of Search .................................... 348/383, 839, 348/840; 353/94, 74, 79, 78, 119, 99; 359/443, 449, 460; 361/735, 725, 727, 724

[56] References Cited

U.S. PATENT DOCUMENTS

| | | | |
|---|---|---|---|
| 5,105,263 | 4/1992 | Shida | 358/29 |
| 5,116,117 | 5/1992 | Miyashita | 353/94 |
| 5,299,017 | 3/1994 | Furuno | 348/786 |
| 5,396,257 | 3/1995 | Someya et al. | 345/1 |
| 5,622,417 | 4/1997 | Conner et al. | 353/69 |
| 5,708,528 | 1/1998 | Furuya | 359/457 |

OTHER PUBLICATIONS

"The next level in display technology, Clarity Visual Systems," product brochure, 1996.

Takeuchi et al., "A 750–TV–Line–Resolution Projector Using 1.5–Megapixel a–Si TFT LC Modules," SID 91 Digest, pp. 415–418.

"The next level in display technology, Clarity Visual Systems," a four page product brochure copyright 1996, Clarity Visual Systems, Wilsonville, Oregon.

Primary Examiner—Safet Metjahic
Assistant Examiner—Christopher Mahoney
Attorney, Agent, or Firm—Stoel Rives LLP

[57] ABSTRACT

A mechanical package for an LCD projector includes approximately equally sized tower and enclosure portions. The tower portion is supported on forward protruding legs and contains optical and electronic modules that slide into its rear and are also accessible from the front of the enclosure portion. The enclosure portion supports on its front a removable projection screen and is mounted vertically offset on the tower portion. A triply folded optical axis provides a suitably long light pathway for projecting a large image on the projection screen without requiring the package to have an undue depth. To stack multiple packages vertically, side margins of the tower portion top surface include L-channels that receive the legs of a package stacked above. The enclosure portion further includes openings that receive the legs protruding from the tower portion stacked above. The legs are supported within the enclosure portion by sliding into U-brackets that are attached to the inner surfaces of the enclosure portion. Fasteners are passed through aligned holes in the legs and U-brackets to secure the vertically stacked packages. To stack multiple packages horizontally, the same fasteners that pass through aligned holes in the legs and U-brackets of the vertically stacked packages are also passed through the corresponding aligned holes in the legs and U-brackets of horizontally adjacent packages.

22 Claims, 5 Drawing Sheets

STAIRSTEP INTERLOCK MOUNTING PACKAGE FOR MULTISCREEN PROJECTION DISPLAYS

TECHNICAL FIELD

This invention relates to video display devices and more particularly to a compact, interlocking packaging structure for liquid crystal projection displays that facilitates their useability and serviceability in large-screen and multiscreen applications.

BACKGROUND OF THE INVENTION

There are previously known techniques for employing arrays of cathode-ray tube ("CRT") displays in "video walls" and signage applications. Multiscreen displays employ an abutted array of substantially identical display devices that each display a subdivided portion of a total image such that together they display the total image. Because multiscreen displays require that each of the display devices be perceived as part of a whole large display device, it is important to make the boundaries between adjacent display devices appear as inconspicuous as possible. Unfortunately, the human eye is very sensitive to boundary discontinuities, making an acceptably "seamless" multiscreen display very difficult to produce.

This is especially true for arrays of CRT displays because of their curved face plates and nondisplayable borders. CRT projection displays eliminate some of the faceplate and border problems, but are typically heavy and deep because of the 48- to 60-inch-long light paths typically required to project an image on 40- to 52-inch screens. Stacking such CRT projection displays into a multiscreen array typically requires placing the lowermost displays on a stand and securing the individual display packages together with "trunk-style" latches. However, because latches on the innermost displays are not accessible, gravity is often depended on to hold a stack of displays together. The resulting multiscreen CRT display stack may be mechanically unstable, is limited to rear access to inner members of the stack, is typically 48- to 60-inches deep, requires service access space behind the rear of the stack, and is generally wasteful of commercially valuable floor space.

CRT-based multiscreen displays also have image stability and image matching problems, which could be mitigated by a digitally addressed, compact, lightweight display, such as the liquid crystal projection display described in "A 750-TV-Line-Resolution Projector Using 1.5-Megapixel a-Si TFT LC Modules," Takeuchi et al., Society for Information Display, SID 91 DIGEST, pp. 415–418. However, liquid crystal displays ("LCDs") have not been readily accepted for use in multiscreen display applications because they have projection lamp-induced luminance variations and liquid crystal display transfer function variations that make luminance matching and color balancing difficult among adjacent displays in an array. Fortunately, solutions to such luminance and color-matching problems are described in copending U.S. patent application Ser. No. 08/740,966, filed Nov. 5, 1996, for COLOR AND LUMINANCE CONTROL SYSTEM FOR LIQUID CRYSTAL PROJECTION DISPLAYS, which is assigned to the assignee of this application and incorporated herein by reference.

What is still needed is a mechanically stable, array-stackable display package having minimal depth and an integral stand that provides front and rear service access to internal modules when stacked in an array. Such a package would render displays serviceable and suitable for use in large screen and/or multiscreen display applications.

SUMMARY OF THE INVENTION

An object of this invention is, therefore, to provide a mechanically stable, array-stackable, packaging apparatus.

Another object of this invention is to provide a mechanically stable method of stacking multiple packages into an array of packages.

A further object of this invention is to provide an LCD projector packaging apparatus and method that achieves the above-described objects.

Still another object of this invention is to provide a compact and serviceable packaging apparatus for an LCD projector.

A mechanical package for an LCD projector includes a tower portion and an about equally sized enclosure portion. The tower portion is supported on forward protruding legs and contains optical and electronic modules that slide into the rear of the tower portion and are accessible from the front of the enclosure portion or the rear of the tower portion. The enclosure portion supports on its front a removable projection screen and is mounted vertically offset on the tower portion. A folded optical axis provides a suitably long light path for projecting a large image on the projection screen without requiring the package to have an undue depth.

To stack multiple packages vertically, side margins of the tower portion top surface include L-channels that are sized to receive and support the legs of a package stacked above. The enclosure portion further includes openings adjacent to the L-channels that receive the legs that protrude from the tower portion stacked above. The legs slide into and are supported within the enclosure portion by U-brackets that are attached to the inner surfaces of the enclosure portion. Fasteners are passed through aligned holes in the legs and U-brackets to secure the vertically stacked packages.

To stack multiple packages horizontally, the same fasteners that pass through aligned holes in the legs and U-brackets of the vertically stacked packages are also passed through the corresponding aligned holes in the legs and U-brackets of horizontally adjacent packages to secure the horizontally stacked packages.

Additional objects and advantages of this invention will be apparent from the following detailed description of a preferred embodiment thereof that proceeds with reference to the accompanying drawings.

DETAILED DESCRIPTION OF A PREFERRED EMBODIMENT

Figure 1:
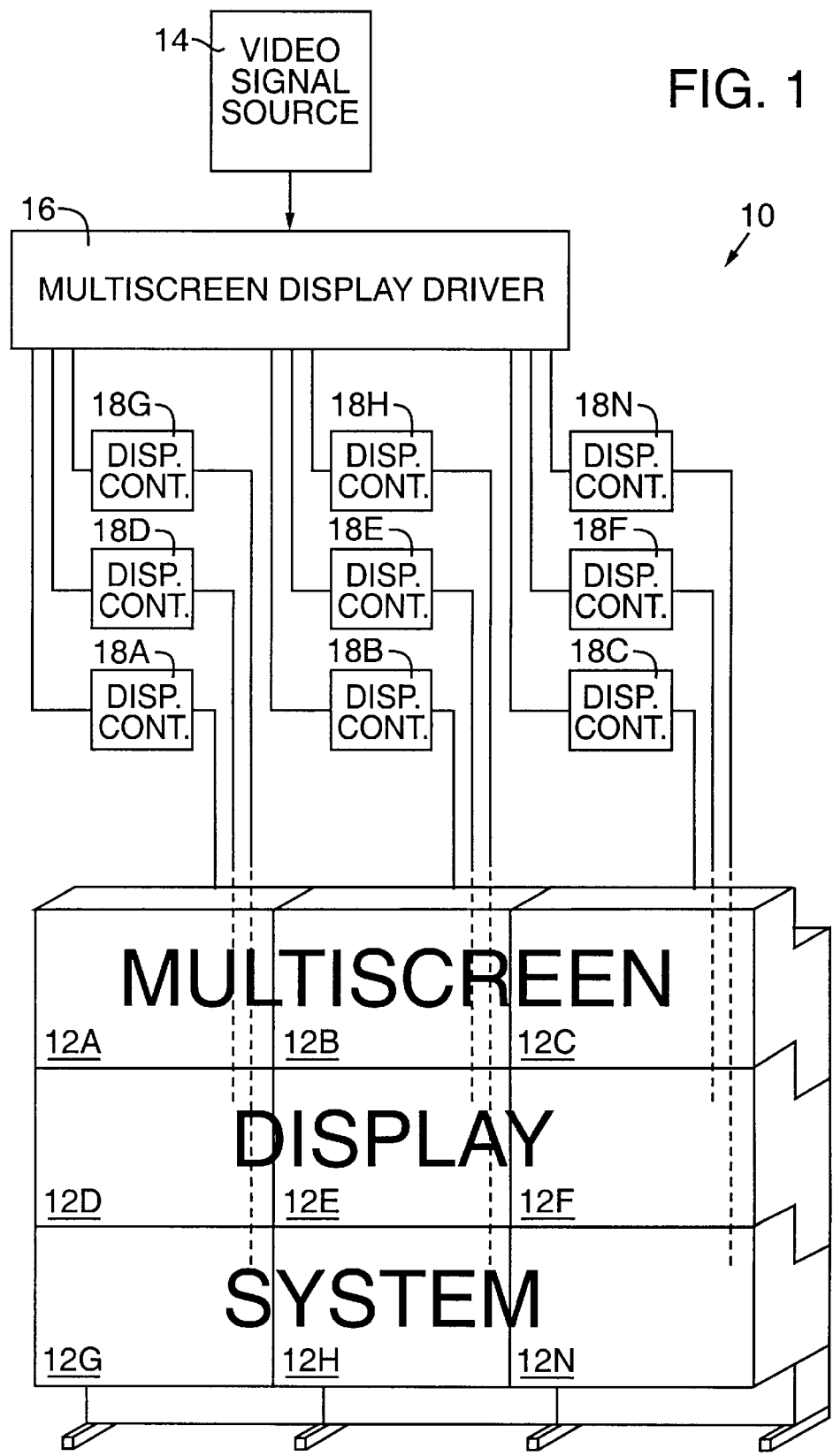
FIG. 1 is a simplified pictorial block diagram of a multiscreen display system of this invention.

FIG. 1 shows an exemplary multiscreen display system 10 employing a three-by-three array of LCD projectors 12A, 12B, ... to 12N (collectively, projectors 12). N may be as small as two and as big as practical to form a very large array of projectors 12, and this invention may also be employed in stand-alone LCD projectors. A conventional video signal source 14, preferably a personal computer ("PC"), drives a conventional multiscreen display driver 16, preferably a PC video controller card model IMAGESTAR 31K, manufactured by Electrosonic Systems, Inc., Minneapolis, Minn. Each of projectors 12 is interconnected with multiscreen display driver 16 by associated display controllers 18A, 18B, ... to 18N that perform LCD projection luminance and color balance functions as described in U.S. patent application Ser. No. 08/740,966, cited above. Display controllers 18 are preferably integrated within projectors 12. Multiscreen display system 10 substantially seamlessly displays a total image having suitably uniform luminance and color balance.

Figure 2:
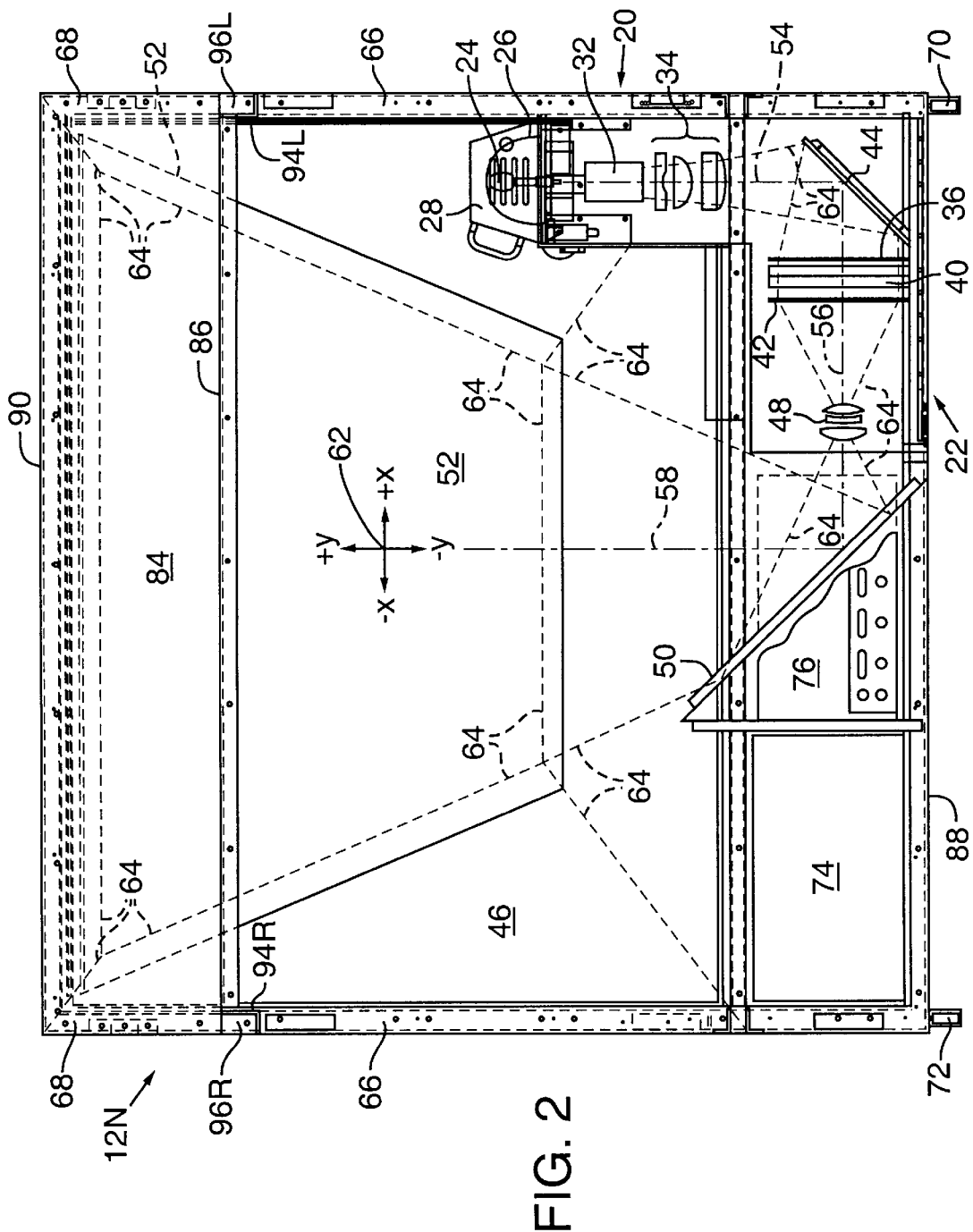
FIGS. 2 and 3 are respective rear and side pictorial elevation views showing structural arrangements of an LCD projector of this invention that is suitable for use in the multiscreen display system of FIG. 1.
Figure 3:
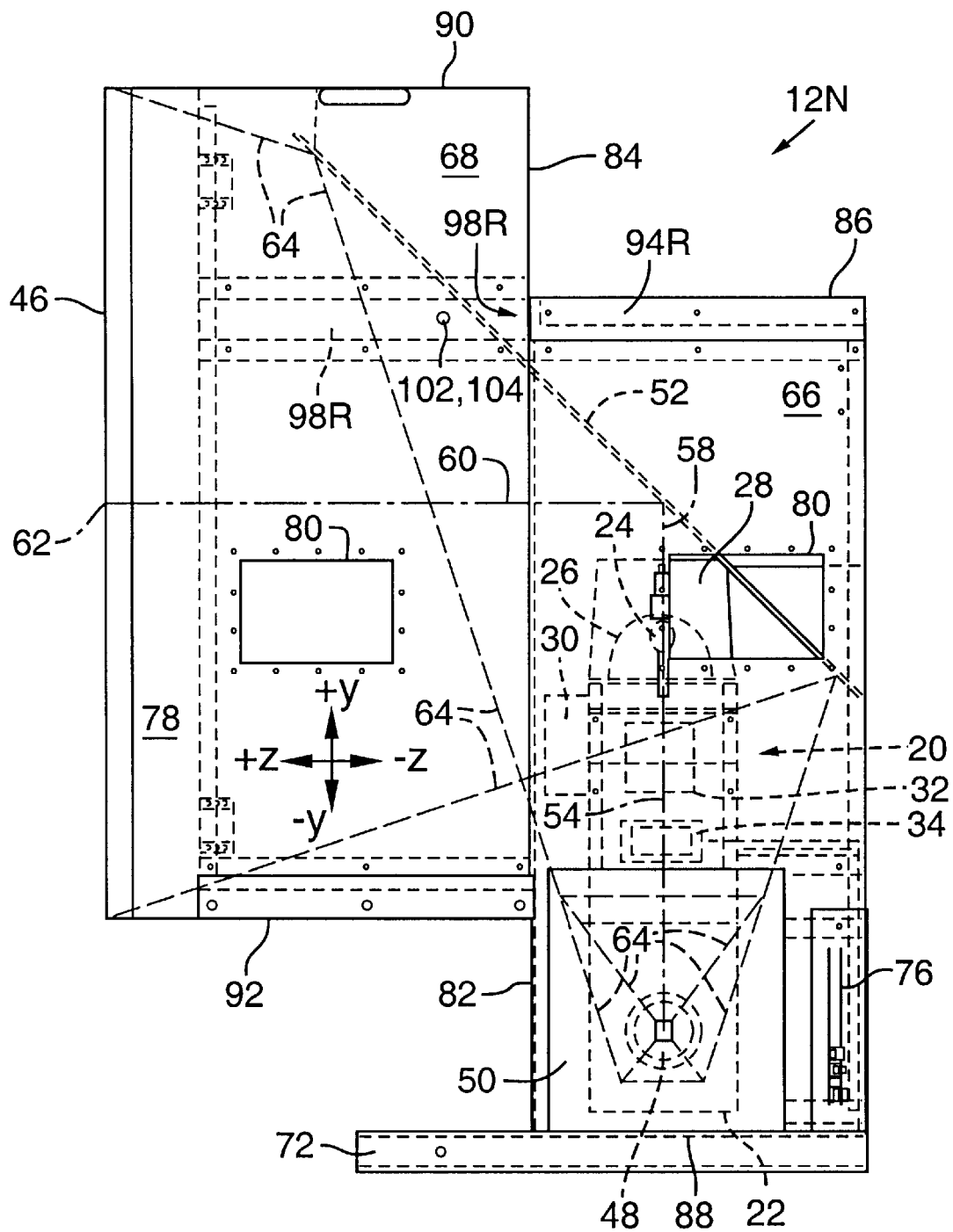

FIGS. 2 and 3 are respective rear and side views showing a representative one, for example 12N, of projectors 12 that is suitable for use with this invention. FIG. 2 is shown with the rear covers of projector 12N removed to reveal its optical subsections, whereas FIG. 3 shows the same subsections in phantom lines. Projector 12N includes two primary optical subsections: a lamp module 20 and an LCD module 22.

Lamp module 20 preferably includes a tungsten halogen or metal halide arc lamp 24 enclosed in an elliptical reflector 26 and housed in a cage assembly 28, all of which are cooled by a lamp fan 30. Arc lamp 24 is preferably a model L5341 manufactured by Hamamatsu located in Hamamatsu, Japan. Lamp module 20 further includes a light homogenizer 32 and a relay lens 34 that may have an optional integral ultraviolet/infrared ("UV/IR") filter such that LCD module 22 is supplied with a substantially uniform field of visible light. Light homogenizer 32 is preferably a well-known mirror tunnel but may also be a fiber optic homogenizer as described in copending U.S. patent application Ser. No. 08/870,094, filed Jun. 5, 1997, for FIBER OPTIC LIGHT HOMOGENIZER FOR USE IN PROJECTION DISPLAYS, which is assigned to the assignee of this application and incorporated herein by reference.

Luminance variations in lamp module 20 are possible due to aging factors, primarily dimming over time of arc lamp 24 and degradation of coatings on elliptical reflector 26 and any optional UV/IR filter in relay lens 34. These aging factors reduce the overall luminance and change the color of the light reaching LCD module 22. The lifetime rating of a typical tungsten halogen or metal halide arc lamp is based on the mean life of the lamp to 50 percent of its initial luminance. Moreover, the luminance of new lamps varies by as much as 20 percent. These two factors account for a possible 60 percent luminance variation between LCD projectors 12 in multiscreen display system 10. Access to and serviceability of lamp module 20 is, therefore, an important factor in the design of LCD projectors 12.

LCD module 22 preferably includes an input fresnel lens 36, an LCD array 40, and an output fresnel lens 42, all of which are cooled by an LCD fan (not shown). LCD array 40 is preferably a model LQ64P312 manufactured by Sharp Microelectronics located in Nara, Japan. LCD module 22 is optically coupled to lamp module 20 by an input fold mirror 44 and is optically coupled to a projection screen 46 by a projection lens 48, an output fold mirror 50, and a large fold mirror 52. Input fold mirror 44 and projection lens 48 are also included within LCD module 22.

The optical components of lamp module 20 are coaxial with an optical axis segment 54 that is preferably aligned in a Y-axis direction. Optical axis segment 54 is preferably bent 90 degrees into alignment with an X-axis direction by input fold mirror 44 to form an optical axis segment 56. The optical components of LCD module 22 are coaxial with optical axis segment 56, which is preferably bent another 90 degrees into alignment with the X-axis direction by output fold mirror 50 (FIG. 3 shows the rear surface of output fold mirror 50) to form an optical axis segment 58, which is preferably bent yet another 90 degrees into alignment with a Z-axis direction by large fold mirror 52 (FIG. 2 shows the rear surface of large fold mirror 52) to form an optical axis segment 60 that terminates at a center 62 of projection screen 46. The triply folded optical axis formed by optical axis segments 54, 56, 58, and 60 provides a suitably long light path for projecting a large image on projection screen 46 without requiring that projector 12N have an undue depth in the Z-axis direction. For example, for projection screen 46 diagonal dimensions of 40 inches and 52 inches, the respective required Z-axis depths are only about 18 inches and 28.5 inches. Optical axis segments 54, 56, 58, and 60 have a combined length that is at least 2.5 times, and preferably 2.6 times, the Z-axis depth.

Image edge ray tracings are indicated by dashed lines 64 to more clearly show the extents of the light propagation pathways through LCD projector unit 12N. Images formed on LCD array 40 are focused on projection screen 46 preferably by adjusting projection lens 48 in the X-axis direction along optical axis segment 56. The projected image is centered on projection screen 46 preferably by translating LCD array 40 in the Y-axis and Z-axis directions transverse to optical axis segment 56. Because fold mirrors 44, 50, and 52 are preferably planar and securely mounted at about 45-degree angles relative to optical axis segments 54, 56, 58, and 60, no fold mirror adjustments are necessary to properly aim the optical axis segments.

The mechanical packaging of LCD projector 12N includes a tower portion 66 and an enclosure portion 68, both of which are about equally sized right rectangular polyhedrons. Tower portion 66 is supported on respective left and right legs 70 and 72 and contains lamp module 20, LCD module 22, and output fold mirror 50. The base of tower portion 66 further encloses a power supply module 74 and a display controller module 76 (shown partly cut away and in phantom in FIG. 2 to reveal output fold mirror 50). Lamp module 20, LCD module 22, power supply module 74, and display controller module 76 each slide into the rear of tower portion 66 and are accessible from the front or rear of projector 12N. Cage assembly 28, which encloses arc lamp 24, is separately removable from the top of lamp module 20 and is readily accessible from the front or rear of LCD projector unit 12N. A further advantage of the vertically removed positioning of cage assembly 28 is that heat generated by arc lamp 24 is naturally convected up and away from heat-sensitive components in LCD module 22, power supply module 74, and display controller module 76.

Enclosure portion 68 is mounted offset about six to 10 inches, preferably about eight inches, in the +Y-axis direction on tower portion 66 and supports projection screen 46 by a screen frame 78. Spring clips removably attach screen frame 78 to the front of enclosure portion 68. Tower portion 66 and enclosure portion 68 together support large fold mirror 52, and each portion includes recesses 80 for left and right side carrying handles. The offset mounting of tower and enclosure portions 66 and 68 exposes a tower front surface 82 and an enclosure rear surface 84. Tower portion 66 further includes a tower top surface 86 and a tower bottom surface 88. Likewise, enclosure portion 68 further includes an enclosure top surface 90 and an enclosure bottom surface 92.

When viewed from the side, as shown in FIG. 3, projector 12N has a stair stepped profile generally characterized as a joined pair of vertically offset right rectangles having a leg protruding from the base of the lowermost rectangle into the space formed under the uppermost rectangle. The resultant profile is an eight-sided parallel polygon having six convex right-angle vertices and two concave right-angle vertices. Projector 12N has an overall package volume, excluding legs 70 and 72, described as a volume resulting from horizontally extruding the eight-sided parallel polygon profile. Alternatively, the two concave right-angle vertices may be replaced by angled surfaces, preferably 45 degrees and, of course, the profile may be any interlocking polygon, such as a four sided parallelogram.

Figure 4:
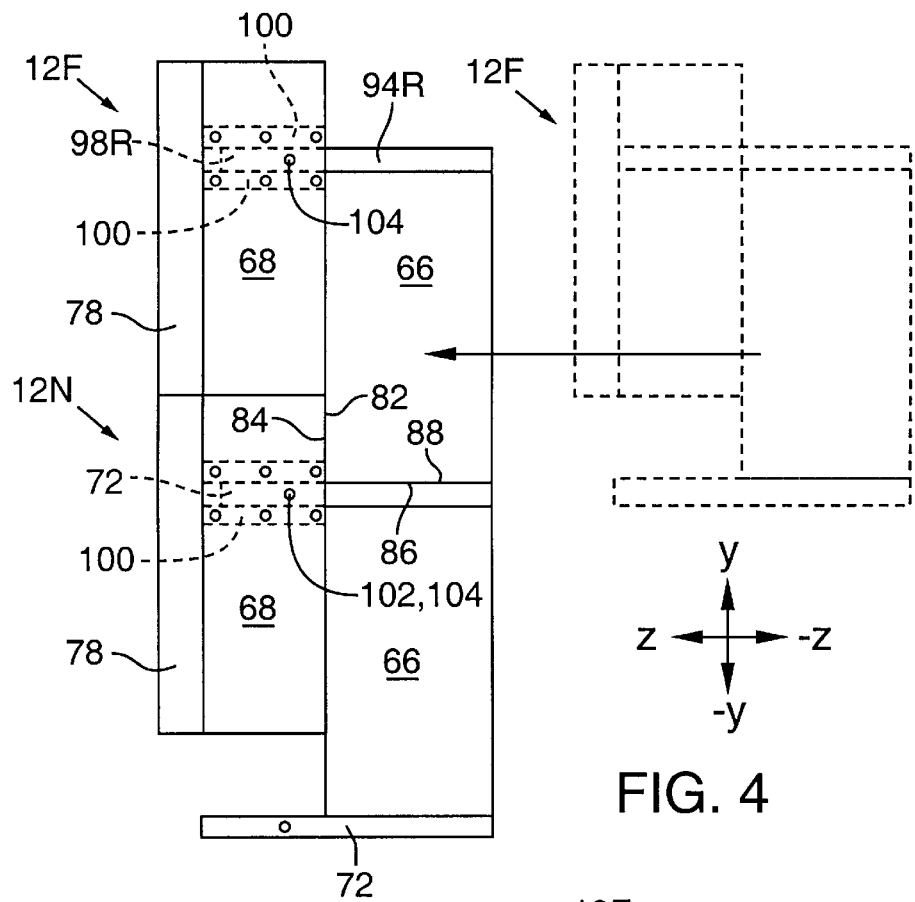
FIG. 4 is a simplified side elevation view of an array of two LCD projectors of FIGS. 2 and 3 showing the interlocking relationship of structures employed to secure the array together vertically.
Figure 5:
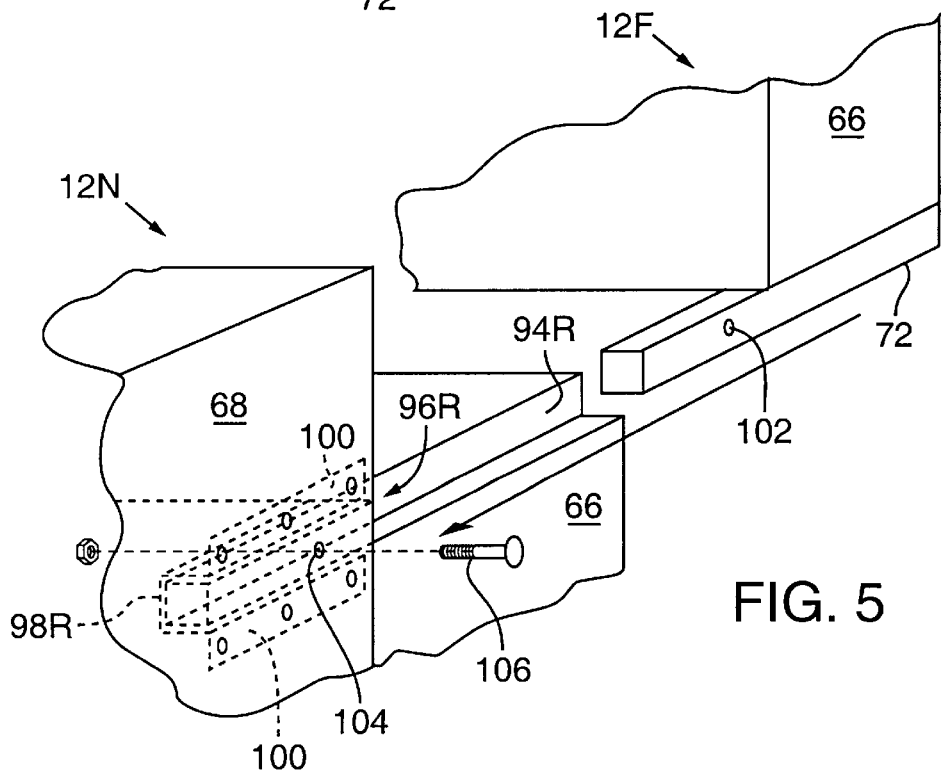
FIG. 5 is an fragmentary isometric view showing a channel and pocket structure of a first LCD projector arranged to receive a leg structure of a second LCD projector.

FIGS. 4 and 5 show an exemplary vertical mating of a pair of projectors, such as 12F and 12N of FIG. 1. In particular, FIG. 4 shows how projector 12F slides from an alternate position (shown in dashed lines) into a mating position (shown in solid lines) with projector 12N. When mated, tower bottom surface 88 of projector 12F is supported by tower top surface 86 of projector 12N, and tower front surface 82 of projector 12F rests against enclosure rear surface 84 of projector 12N.

FIG. 5 shows how projectors 12F and 12N are secured together in the mating position. The left and right side margins of tower top surface 86 include respective left and right L-channels 94L and 94R that are sized to receive and support respective left and right legs 70 and 72. Also, enclosure rear surface 84 includes left and right openings 96L and 96R that are adjacent to the ends of respective left and right L-channels 94L and 94R and are sized and spaced apart to receive legs 70 and 72 as they slide forward and protrude into enclosure portion 68. Legs 70 and 72 are supported within enclosure portion 68 by respective left and right U-brackets 98L and 98R, which are attached to the inner surface of enclosure portion 68 by side flanges 100 and conventional fasteners. The openings between U-brackets 98 and the inner surface of enclosure portion 68 form pockets that are sized to slidably receive legs 70 and 72 as projector 12F is moved into the mating position with projector 12N. When properly mated, leg holes 102 align with U-bracket holes 104. Conventional fasteners 106 are passed through aligned holes 102 and 104 and tightened to secure legs 70 and 72 within U-brackets 98, thereby securing projectors 12F and 12N together in the mating position.

In the mating position shown in FIG. 4, screen frames 78 and rear panels (not shown) are removable to make internal modules accessible from the fronts and rears of LCD projector units 12F and 12N.

Figure 6:
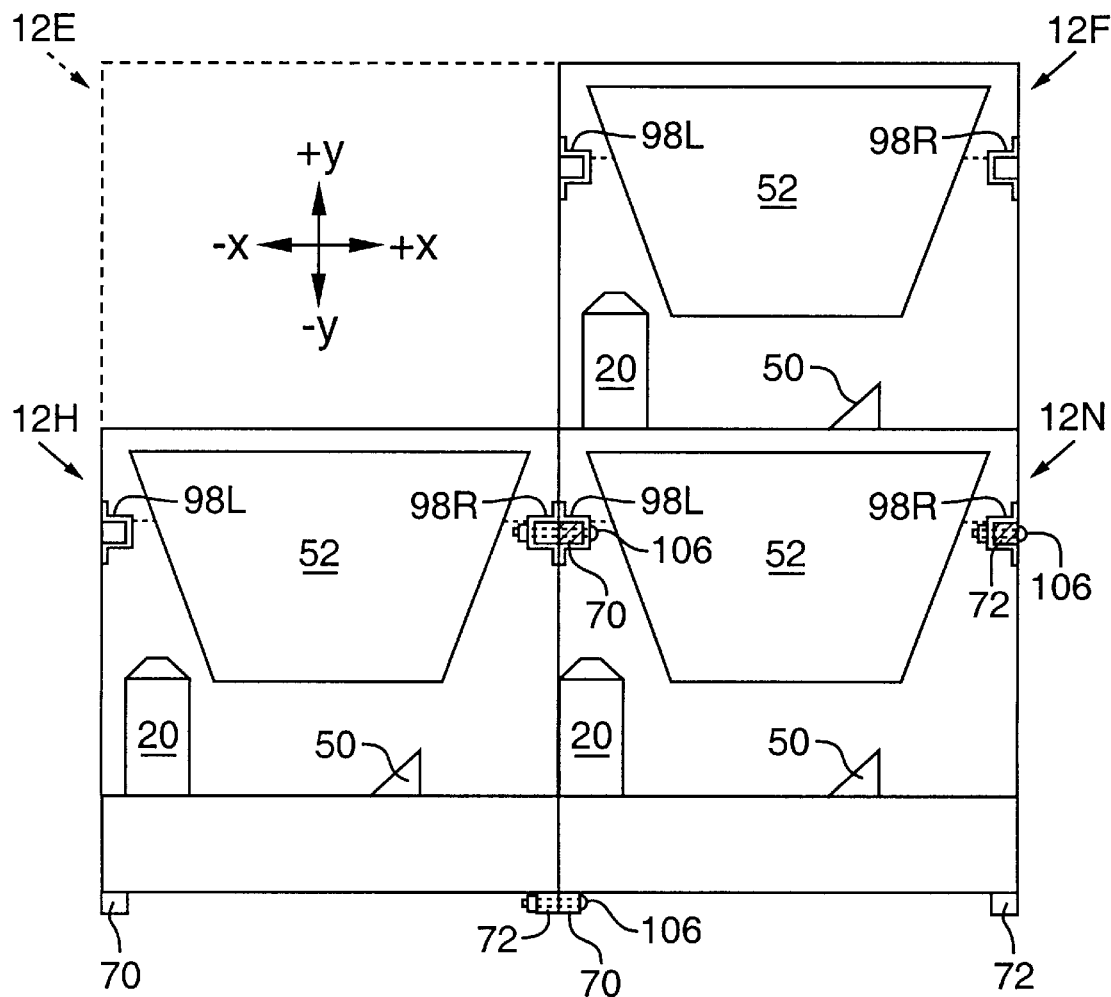
FIG. 6 is a simplified front elevation view of an array of three LCD projectors of FIGS. 2 and 3 with their projection screens removed to reveal the interlocking relationship of structures employed to secure the array together horizontally and vertically.

FIG. 6 shows a front view of an exemplary vertical and horizontal mating together of three projectors, such as 12F, 12H, and 12N of FIG. 1. A mating position for a fourth projector, such as 12E of FIG. 1, is shown in phantom. Each of projectors 12 is shown with screen frame 78 removed to reveal internal mounting details. Large fold mirrors 52, lamp modules 20, and portions of output fold mirrors 50 are shown for visual orientation purposes. Legs 70 and 72 and left and right U-brackets 98L and 98R are shown for each of projectors 12F, 12H, and 12N. Note, however, that only legs 70 and 72 of projector 12F are mated within left and right U-brackets 98L and 98R of projector 12N. Legs 72 and 70 of respective projectors 12H and 12N are adjacent but not mated within any U-brackets. Fasteners 106 secure legs 70 and 72 of projector 12F within respective U-brackets 98L and 98R of projector 12N. One of fasteners 106 further forces together U-brackets 98R and 98L of respective projectors 12H and 12N, thereby securing them together. An optional one of fasteners 106 forces together legs 72 and 70 of respective projectors 12H and 12N, further securing them together.

Skilled workers will recognize that portions of this invention may be implemented differently from the implementations described above for a preferred embodiment. For example, the mating packaging technique is not limited to use with LCD projection displays and may be employed with CRT displays, nonprojection displays, and many other types of products. When used with displays, this invention may be readily adapted to many different combinations of screen sizes, enclosure and tower dimensions, offset dimensions, leg sizes, and styles, optical path variations, and display types. Likewise, because the legs can be adequately secured with mating fasteners, it is not necessary to enclose them in U-bracket defined pockets, although the pockets aid in mating units together and supporting them securely until the fasteners are tightened. Likewise, the legs can straddle the enclosure rather than slide into pockets.

It will be obvious to those having skill in the art that many changes may be made to the details of the above-described embodiment of this invention without departing from the underlying principles thereof. Accordingly, it will be appreciated that this invention is also applicable to projection displays other than those found in multiscreen LCD projection display applications. The scope of the present invention should, therefore, be determined only by the following claims.

We claim:

1. A first stackable package apparatus for an electronic product, comprising:

a tower portion having base, top, left, right, front, and rear surfaces and shaped as a polyhedron having width, height, and depth dimensions measured in respective X-, Y-, and Z-axis directions;

an enclosure portion having base, top, left, right, front, and rear surfaces and shaped as a polyhedron, the rear surface of the enclosure portion attached to the front surface of the tower portion aligned in the X-axis direction and offset in the Y-axis direction such that the enclosure portion is elevationally higher than the tower portion; and at least a first leg protruding in the Z-axis direction from the bottom surface of the tower portion and spaced apart from the bottom surface of the offset enclosure portion.

2. The apparatus of claim 1 further including at least a second stackable package sized and shaped the same as the first stackable package, the second stackable package positioned in the Y-axis direction adjacent to the first stackable package so that the offset top surfaces of the tower and enclosure portions of the first stackable package overlay the offset bottom surfaces of the respective tower and enclosure portions of the second stackable package.

3. The apparatus of claim 2 in which the top surface of the tower portion of the first stackable package further includes at least a first L-channel aligned in the Z-axis direction and positioned to support the first leg protruding from the bottom surface of the tower portion of the second stackable package.

4. The apparatus of claim 2 in which the rear surface of the enclosure portion of the first stackable package further includes at least a first opening positioned to receive the first leg protruding from the bottom surface of the tower portion of the second stackable package.

5. The apparatus of claim 4 in which the enclosure portion of the first stackable package further includes an inner surface to which the first leg is attached by a fastener.

6. The apparatus of claim 5 in which the first stackable package encloses a liquid crystal projection display and in which the front surface of the offset enclosure portion includes a removable projection screen to provide a front service access to the fastener.

7. The apparatus of claim 4 in which the enclosure portion of the first stackable package further includes an inner surface to which is attached at least a first U-bracket that forms a pocket between the inner surface and the U-bracket, the pocket being aligned in the Z-axis direction and sized to slidably receive the first leg protruding from the bottom surface of the tower portion of the second stackable package.

8. The apparatus of claim 7 in which the first leg is secured within the pocket by a fastener.

9. The apparatus of claim 1 further including at least a second stackable package sized and shaped substantially the same as the first stackable package, the second stackable package positioned in the X-axis direction adjacent to the first stackable package so that the offset right surfaces of the tower and enclosure portions of the first stackable package overlay the offset left surfaces of the respective tower and enclosure portions of the second stackable package.

10. The apparatus of claim 9 in which the first and second stackable packages are attached together by a fastener passing through aligned holes in adjacent ones of the legs of the first and second stackable packages.

11. The apparatus of claim 1 in which the first stackable package encloses a liquid crystal projection display having a folded optical axis having a length and the enclosure portion includes a depth dimension measured in the Z-axis direction, the length of the folded optical axis being at least 2.5 times the combined depth dimensions of the tower and enclosure portions.

12. The apparatus of claim 1 in which the first stackable package has an overall width of at least 32 inches, an overall height of at least 32 inches, an overall depth of at least 18 inches, and an offset distance in the Y-axis direction between the tower and enclosure portions in a range of 6 inches to 10 inches.

13. A method of making a first stackable package for an electronic product, comprising the steps of:

providing a tower portion having base, top, left, right, front, and rear surfaces and shaped as a rectangular polyhedron having width, height, and depth dimensions measured in respective X-, Y-, and Z-axis directions;

providing an enclosure portion having base, top, left, right, front, and rear surfaces and shaped as a rectangular polyhedron;

aligning the rear surface of the enclosure portion with the front surface of the tower portion;

offsetting the rear surface of the enclosure portion in the Y-axis direction relative to the front surface of the tower portion such that the enclosure portion is elevationally higher than the tower portion;

attaching the enclosure portion to the tower portion; and attaching at least a first leg to the bottom surface of the tower portion so that it protrudes therefrom in the Z-axis direction and is spaced apart from the bottom surface of the offset enclosure portion.

14. The method of claim 13 further including providing at least a second stackable package sized and shaped the same as the first stackable package, and positioning the second stackable package in the Y-axis direction adjacent to the first stackable package so that the offset top surfaces of the tower and enclosure portions of the first stackable package overlay the offset bottom surfaces of the respective tower and enclosure portions of the second stackable package.

15. The method of claim 13 further including forming at least a first L-channel in the top surface of the tower portion of the first stackable package by aligning the first L-channel in the Z-axis direction and positioning the L-channel to support the first leg protruding from the bottom surface of the tower portion of the second stackable package.

16. The method of claim 14 forming a first opening in the rear surface of the enclosure portion of the first stackable package and positioning the opening to receive the first leg protruding from the bottom surface of the tower portion of the second stackable package.

17. The method of claim 16 in which the enclosure portion of the first stackable package further includes an inner surface, and the method further includes attaching the first leg of the second stackable package to the inner surface of the first stackable package.

18. The method of claim 17 further including enclosing a liquid crystal projection display in each of the first and second stackable packages, providing the front surface of the offset enclosure portions with removable projection screens, removing the removable projection screens, and performing the attaching step.

19. The method of claim 16 in which the enclosure portion of the first stackable package further includes an inner surface, and the method further includes forming a pocket adjacent to the inner surface, aligning the pocket in the Z-axis direction, and sizing the pocket to slidably receive the first leg protruding from the bottom surface of the tower portion of the second stackable package.

20. The method of claim 19 further including securing the first leg within the pocket with a fastener.

21. The method of claim 13 further including at least a second stackable package sized and shaped the same as the first stackable package, the method further including positioning the second stackable package in the X-axis direction adjacent to the first stackable package so that the offset right surfaces of the tower and enclosure portions of the first stackable package overlay the offset left surfaces of the respective tower and enclosure portions of the second stackable package.

22. The method of claim 21 further including attaching the first and second stackable packages together by mutually securing adjacent ones of the legs of the first and second stackable packages.

* * * * *